United States Patent [19]

Spence

[11] 4,320,017
[45] Mar. 16, 1982

[54] SULFURIZED/AMINATED MIXTURE OF ETHYLENE-BASED POLYOLEFIN AND POLYISOBUTYLENE FOR LUBRICATING OIL

[75] Inventor: J. Ronald Spence, Bartlesville, Okla.

[73] Assignee: Standard Oil Company (Indiana), Chicago, Ill.

[21] Appl. No.: 196,030

[22] Filed: Oct. 10, 1980

[51] Int. Cl.³ .................... C08L 23/32; C08L 23/36; C10M 1/32; C10M 1/38
[52] U.S. Cl. ........................................ 252/43; 252/47; 525/192; 525/194; 525/211; 525/240; 524/525; 524/528; 524/491
[58] Field of Search ............... 525/192, 194, 240, 211; 260/33.6 AQ; 252/43, 47

[56] References Cited

U.S. PATENT DOCUMENTS

| | | | |
|---|---|---|---|
| 2,364,830 | 12/1944 | Towne | 252/43 |
| 3,299,183 | 1/1967 | Borghese | 525/240 |
| 4,212,787 | 7/1980 | Matsuda et al. | 525/240 |

Primary Examiner—Carman J. Seccuro
Attorney, Agent, or Firm—Mark DiPietro; William T. McClain; William H. Magidson

[57] ABSTRACT

An effective amount of polyisobutylene effectively reduces polymerization and cross-linking reactions resulting in molecular weight and viscosity increase during production of dispersant viscosity index improvers by the amination and/or sulfurization of polyethylene containing polymers.

1 Claim, No Drawings

SULFURIZED/AMINATED MIXTURE OF ETHYLENE-BASED POLYOLEFIN AND POLYISOBUTYLENE FOR LUBRICATING OIL

This invention relates to lubricating oil and lubricating oil additives. More particularly this invention relates to functionalized polymeric additives called dispersant viscosity index improvers which provide to lubricating oils dispersancy and viscosity index control at engine operating temperature.

Dispersancy is the ability of an additive to disperse and suspend, in a lubricant, dirt, insoluble combustion by products, etc. which otherwise would form harmful deposits in the engine. Viscosity index control provides the lubricant with sufficient viscosity at engine operating temperature for efficient lubrication.

One class of dispersant viscosity index improvers is commonly prepared by functionalizing a polyolefin having viscosity index improving properties with polar reactants such as sulfur compounds and/or amine compounds, etc. Dispersancy results from the presence of polar groups formed from these polar reactants on the essentially nonpolar oil-soluble polymer. Deposit forming, essentially oil insoluble combustion by products are bound by the polar functional groups to the oil soluble polymer. Since the polymer is substantially oil soluble, the impurities are suspended and held in the oil reducing formation of harmful deposits on engine surfaces.

The high molecular weight and linear nature of the polyolefin produces viscosity index control in the lubricant. At ambient temperatures, lubricants have relatively high viscosity. At engine operating temperatures about 90°–200° C. (195°–395° F.), the lubricants tend to lose a substantial amount of viscosity. The addition of polymeric viscosity index improvers increases high temperature viscosity. At ambient temperature polymeric viscosity improvers tend to be tightly coiled into spherical bodies without substantial contribution to viscosity. As the temperature increases the polymer tends to uncoil and become extended in solution. This extended, more linear form increases viscosity in proportion to the degree of extension. Thus as the temperature increases the polymer contributes sufficient viscosity to the oil to maintain adequate lubrication.

Often during amination or sulfurization, the molecular weight and viscosity of ethylene based polymeric additives containing polyethylene units, $(-CH_2CH_2-)_x$, can increase by ten-fold or more. This viscosity and molecular weight increase results from cross-linking and polymerization reactions caused by creation of reactive sites common during amination or sulfurization. This cross-linking, or polymerization reaction resembles in some ways the vulcanization of rubber in which large numbers of polymer molecules are linked by sulfide and polysulfide bonds. The viscosity increase can prevent further manufacturing of the composition since the high viscosity impedes filtering, pumping and blending. In the event that the viscous composition can be successfully manufactured, the viscosity of the material is often too high to be used in lubricants. At any engine temperature the lubricant would be too thick to be pumped through the engine, filtered, or provide adequate lubrication. The high molecular weight can also reduce the solubility and the dispersancy of the additive in lubricating oil.

Thus, a need exists to control or limit cross-linking and the associated molecular weight and viscosity increase that is common during sulfurization or amination of an amorphous ethylene based polyolefin.

A primary object of the invention is to improve the dispersant and viscosity index improving quality of functionalized polymeric sulfurized or aminated lubricating oil additives. Another object of the invention is to prevent undesirable molecular weight and viscosity increase during manufacture of aminated or sulfurized polyolefin dispersant viscosity index improvers. Other objects appear herinafter.

I have discovered that the increase in molecular weight and viscosity observed during the sulfurization and the amination of amorphous ethylene based polyolefins containing a polyethylene units, $(-CH_2CH_2-)_x$, can be controlled by the addition of an effective amount of a polyisobutylene polymer. Apparently, polyisobutylene, containing repeating units of fully substituted tertiary carbon atoms, when added to ethylene based polymers reduces the tendency of the amorphous ethylene based polyolefin to cross-link or polymerize during the sulfurization or amination reaction. The polyisobutylene apparently acts as a chain terminating agent which prevents substantial polymerization or crosslinking and molecular weight increase by rapidly reacting with the crosslinking or polymerizing active sites on the polymer, ending the reaction. The fully substituted carbon atoms of the polyisobutylene are unreactive in the cross-linking-polymerization reactions, and hence, tend to dilute the concentration of reactive cross-linking or polymerization sites in the amorphous polymers. Since the polyisobutylene can also act as a viscosity index improver, the addition of the polyisobutylene can provide added viscosity index control while preventing the unwanted viscosity and molecular weight increase.

Briefly, the dispersant viscosity index improving additives of this invention are prepared by the sulfurization and/or amination of a mixture of a polyisobutylene polymer and a substantially amorphous polymer comprising ethylene and at least one $C_{3-18}$ mono- or polyunsaturated olefin. Commonly copolymers contain about 95–30 wt% ethylene and 5 to 70 wt% $C_{3-18}$ mono- or polyunsaturated olefin preferably 35 to 45 wt% $C_{3-18}$ mono- or polyunsaturated olefin. Terpolymers contain about 90 to 30 wt% ethylene, about 10 to 70 wt% $C_{3-18}$ mono-olefin and about 1 to 30 wt% $C_{4-18}$ diolefin ($C_{4-18}$ conjugated or $C_{5-18}$ nonconjugated diene).

The well-known copolymers and terpolymers of this invention subject to cross-linking comprise viscous or substantially atactic polymers comprising ethylene, a $C_{3-18}$ olefin, and optionally, a $C_{4-18}$ conjugated or $C_{5-18}$ nonconjugated diene. Examples of the $C_{3-18}$ olefin include propylene (propene), 1-butene, 2-butene, isobutylene (2-methyl-propene), 1-pentene, 2-hexene, 3-heptene, 4-methyl-2-pentene, t-decene, 1-dodecene, 1-octadecene, etc. Representative examples of conjugated diolefins (dienes) include butadiene, 1,3-hexadiene, 1,3-heptadiene, 1,3-octadiene, 2,4-octadiene, 2,4-decadiene, branched acyclic dienes such as 5-methyl-1,4-hexadiene, 3,7-dimethyl-1,7-octadiene, etc; and multiring, cyclic, fused and bridged ring dienes such as cyclohexadiene, 5-methylene-2-norbornene, 5-ethylidene-2-norbornene, etc.

These viscous polymers are well known in the art, and examples of the polymers include ethylene-propylene copolymers, ethylene-octadecene copolymers, ethylene-styrene copolymers, octadecene-styrene copolymer, ethylene-hexene-butadiene, terpolymers, ethylene-propylene-norbornene terpolymers, ethylene-propylene-5-ethylidene-2-norbornene terpolymers, ethylene-octadecene-5-ethylidene-2-norbornene terpolymers, etc. These copolymers and terpolymers are produced by polymerizing olefinic-monomers in liquid or gas phase using aluminum chloride, sulfuric acid, acidic catalysts, and Ziegler-Natta catalysts etc. well known in the art comprising in addition, metal compounds of Groups IVB, VB and VIB of the Periodic Table, and organometallic reducing compounds from Groups IIA, IIB, and IIIA. For example, $VOCl_3$; $VO(AcAc)_2$; $VOCl(OBu)$, etc., in the presence of diethylenealuminum chloride, triisobutylaluminum, diethylaluminum chloride, etc.

The copolymers generally have a molecular weight of from about 600 to 500,000, preferably 1,000 to 200,000, and most preferably 2,000 to 100,000 to provide the high viscosity index control. These copolymers and terpolymers comprise essentially atactic or amorphous liquid or semi-solid or non-crystalline polyolefins, but may contain up to 25 percent by weight crystalline segments as determined by X-ray or differential scanning calorimetric methods. The polymers and copolymers of the invention can be degraded prior to reaction using oxidative or mechanical degradative methods. Mechanical degradation is used to adjust and control molecular weight and polydispersion ($\overline{M}w/\overline{M}n$) of the polymer. Oxidative degradation controls molecular weight and produces carbonyl and other oxygen containing substituents on the polymer chain and associated sites which can be functionalized with molar groups using a variety of reactions including the Mannich reaction with formaldehyde or a formaldehyde-yielding compound and an amine.

Polyisobutylene is a well-known amorphous polymer produced from isobutylene containing streams derived from petroleum refineries which can contain other polymerizable hydrocarbons. Isobutylene monomer tends to be highly reactive and polymerizes to the substantial exclusion of other monomers. Polyisobutylene is commonly prepared by polymerization of a petroleum stream in the presence of aluminum chloride or other acidic catalysts. Molecular weights of the polyisobutylene commonly range from 200 to about 50,000. The polyisobutylene having a molecular weight from about 600 to about 10,000 and preferably about 900–5,000 is useful in this invention in reducing crosslinking of the terpolymer and providing added viscosity index improvement in the finished additive composition at low cost.

The amine reactant useful in the preparation of the lubricating additives of this invention includes primary and secondary aliphatic amines and polyamines having the formula $NH_2(CH_2)_yNH_2$, wherein y is an integer of 3 to 12; polyalkylene polyamines of the general formula $NH_2[(A-NH)]_xH$ wherein A is an alkylene unit having 2 to 6 carbon atoms and x is an integer from 2 to 10. Suitable amines include methylamine, dibutylamine, cyclohexylamine, propylamine, decylamine, trimethylenediamine, hexamethylenediamine, ethylenediamine, diethylenetriamine, triethylenetetraamine, tetraethylenepentamine, tripropylenetetraamine, tetrapropylenepentamine, or mixtures thereof and other polyalkylene polyamines in which the alkylene group contains about 12 carbon atoms. Other useful polyamines include N-amino-alkyl morpholine, 1,3-propane polyamines, polyoxy polyamines, bis(aminoalkyl) piperazine, bis(aminoalkyl) ethylene diamine, and bis(aminoalkyl) propylene diamine. Optionally, formaldehyde or formaldehyde yielding reagents can be used to promote the amination reaction, including, for example, formaldehyde, formalin, paraformaldehyde, trioxane, etc.

Sulfur or sulfur-yielding compounds include elemental sulfur, sulfur dichloride, sulfur monochloride, hydrogen sulfide, a phosphorous sulfide such as phosphorus pentasulfide ($P_2S_5$), etc. Elemental sulfur in a molten or particulate form is preferred for reasons of reactivity and ease of handling.

In somewhat greater detail, the additives of this invention can be prepared by sulfurizing and/or aminating a mixture of polyisobutylene and an ethylene based viscous or substantially atactic polyolefin subject to crosslinking.

Commonly, the polyolefin subject to cross-linking is blended with about 0.1–20, preferably 1–6 moles of polyisobutylene per mole of ethylene based polyolefin prior to amination or sulfurization for efficient prevention of viscosity and molecular weight increase. The polyisobutylene-polyolefin mixture can be dissolved in an inert solvent such as hexane, heptane, lingroin, xylene, benzene, petroleum oil fractions, lubricating oil, kerosene, gasoline, etc., prior to the reaction.

The polymer-polyisobutylene can be reacted with from about 0.1 to about 10 moles of sulfur compound per mole of polyisobutylene and polyolefin contained in the mixture, preferably from about 3 to about 5 moles of sulfur can be added per mole of polyisobutylene and polyolefin. Sulfurization reactions can be promoted using a catalytic amount about 0.001 to about 1 mole of catalyst per mole of sulfur. Catalysts comprise free radical and acidic catalysts such as sulfur chlorides, peroxides, sulfonic acids, chlorine, etc.

The sulfurized polyolefin mixture can be aminated by contacting the sulfurized mixture with about 1.0 to 20 moles of amine per mole polyisobutylene and of pololefin. Preferably to attain a high proportion of amine functionality with reasonable consumption of amine about 2.0 to 5.0 moles of amine per mole of polyisobutylene and polyolefin is used.

Sulfurized polyolefin mixture can be directly aminated. Sulfurization produces sulfur and non-sulfur containing active sites on the polyolefin chain reactive with amines and other reactants. Detail regarding the sulfurization and amination reactions can be found in U.S. Pat. Nos. 3,459,664 and 3,364,232 which are expressly incorporated by reference hereto.

The sulfurized material is converted into a dispersant by means of reaction with amine, optionally, to promote the amination, in the presence of formaldehyde or a formaldehyde-yielding reagent. The sulfurized olefin can be reacted with from about 0.5–10 moles of an amine per mole of olefin originally charged. The amination reaction is commonly performed at a temperature between about 50°–400° C., preferably a temperature of about 150°–200° C. for reasons of ease reaction, and low degradation of products. While the reaction time is variable depending on purity, concentration of ratio of reactants, the reaction is commonly complete at about 2–24 hours. Volatile and particulate materials can be conveniently removed at this point. The amination can be promoted by the presence of formaldehyde or a formaldehyde-yielding reagent. Formaldehyde also reacts with free amino groups which often can be deposit precursors or corrosive in the engine into non-corrosive dispersant moieties. Commonly, from about 0.5 to about 10 moles of formaldehyde or formaldehyde-yielding compound can be added per mole of amine. Preferably, from about 1 to 2.5 moles of formaldehyde or formaldehyde-yielding compound is added per mole of amine for reasons of efficient reaction and low consumption of reactants. The reaction of the amine, formaldehyde and the sulfurized-oxidized material can be conveniently monitored by observing the 1720 CM$^{-1}$ band in the infrared (IR) spectra. The reaction can be considered essentially complete when the band has substantially disappeared.

Either ethylene based polymer, the polyisobutylene or mixtures thereof can be mechanically or oxidatively degraded prior to reaction with sulfur and amine. Mechanical degradation is commonly performed in well-known processes in apparatus, such as blenders or homogenizers, directing high shear forces on the polymer solution. The mechanical degradation reduces viscosity and molecular weight to desired level. Oxidative degradation is commonly performed by contacting the polymer in solution with oxidants such as oxygen containing gas to introduce carbonyl, aldehyde, hydroxyl and other oxygen containing groups into the polymer chain. The oxygen containing groups produce active sites, on carbon atoms alpha to the carbonyl or other oxygen containing group, that participate in a variety of reactions useful for production of derivatives of the polymer.

Oxidatively degraded polymers commonly are aminated by reacting the oxidized polymer, formaldehyde or a formaldehyde-yielding compound and the amine. This reaction is taught in Culbertson, U.S. Pat. No. 3,872,019 and West, U.S. Pat. Nos. 4,011,380, and 4,131,553, which are expressly incorporated by reference herein.

Both the sulfurization and amination reaction can produce great quantities of tarry or charged byproducts which an contaminate the product and hinder filtration and other purification steps.

The removal of tarry byproducts of the olefin-sulfur-amine reaction can be promoted by performing the amination or sulfurization reaction in the presence of an alkali metal or an alkaline earth metal compound. About 0.01-20 moles of the alkali metal or alkaline earth metal compound per mole of amine can be added to the reaction mixture simultaneously with the sulfur or sulfur-yielding compound or the amine. Sodium hydroxide, lithium chloride, potassium chloride, calcium oxide, calcium hydroxide, magnesium oxide, or magnesium hydroxide, barium hydroxide, calcium carbonate, barium chloride, etc. can be added to the reaction mixture to reduce the tarry material. Apparently, the alkali metal or alkaline earth metal compounds react with or absorb the tarry reaction byproducts and reduce the sticky-tacky character or the tarry material. The tarry-metal oxide product then precipitates and can be easily removed by washing, filtration or centrifugation.

Commonly, the alkali metal or alkaline earth metal compound can be added simultaneously with the amine, prior to the amine, or after the amine. However, the best results are obtained when the alkaline earth metal is added prior to or simultaneously with the amine compound.

Sulfurization and amination reactions can be conducted at a temperature from about 50° C. to about 300° C. at atmospheric or superatmospheric pressure in an inert atmosphere or in ambient conditions. Commonly, the reactions take from about 30 minutes to about 24 hours, depending on concentration, purity of reactants, and concentrations. At the end of the reaction, the reaction products are generally stripped with an inert gas to remove volatile materials and are commonly filtered to remove undesirable precipitates.

The additives can be made in batch or continuous operation. In batch operation, the individual components are added to a suitable reaction vessel together or in discrete portions neat or dissolved in an inert solvent. The components can be heated to control viscosity. In continuous operation, the reactant or reactants are added continuously to a horizontal or vertical reaction zone at appropriate feed rates in diluent or neat at temperatures to promote easy handling, reaction and solubility.

The reaction products of this invention are effective lubricant compositions when used in amounts of about 0.01 to 20 weight percent based on the oil. Suitable lubricating base oils are mineral oils, petroleum oils, synthetic lubricating oils, and natural lubricating oils of animal or vegetable origin. Concentrates of the additive in appropriate base oils containing greater than 10 weight percent are convenient for producing finished lubricants at blending sites other than the manufacturing site of the additives. A variety of other additives can be used with the additive of this invention, including anti-oxidants, dispersants, corrosion inhibitors, wear inhibitors, friction modifiers, detergents, anti-bacterial agents, etc.

The additives of this invention are evaluated using the Spot Dispersancy Test. In the Spot Dispersancy Test, the ability of the additive in the lubricating oils to suspend and disperse engine sludge was tested. To perform this test, to an amount of engine sludge produced in a VC or VD engine test is added about 15 wt.% based on the sludge of an experimental additive to be tested. The sludge and additive are incubated in an oven at 146° C. for 24 hours. After this period, the mixture is spotted on a clean white blotter paper. The oil diffuses through the blotter paper carrying the sludge to some extent, depending on the dispersancy of the additive forming an oil diffusion ring and a sludge diffusion ring. The dispersancy of the additive is measured by comparing the ratio of the radius of the oil diffusion ring to the radius of the sludge diffusion ring. The diameter of the sludge ring is divided by the diameter of the oil ring, and the result is multiplied by 100 and is presented as a percent dispersancy. The higher the number, the better dispersant property of the additive.

The following examples and data are illustrative of methods for the preparation and properties of the products of this invention. The examples should not be used to unduly limit the scope of the invention.

EXAMPLE I

Into a three-neck 1-liter reaction vessel equipped with a reflux condenser, water trap, stirrer, nitrogen inlet tube, heater and thermostat was added 400 grams (0.01 moles) of a 10 wt. % solution of ethylene-propylene-5-ethylidene-2-norbornene terpolymer in 5 W oil and 115 grams (0.05 moles) of a polyisobutylene polymer having a molecular wt. of about 2,300. The mixture was stirred and heated to a temperature of 180° C. and 11.53 grams (0.36 moles) of sulfur were added. The resulting mixture was stirred and heated to a temperature of 230° C. for 5 hours to permit the sulfur to react. The mixture was stripped of volatile material for one hour with a stream of nitrogen at 2 cu. ft per hour. The mixture was cooled to 80° C. and 5.67 grams (0.28 moles) of tetraethylene pentamine, 10.0 grams (0.14 moles) of magnesium hydroxide, 20 ml. of water, and 200 ml of xylene were added. The mixture was stirred and heated to a temperature of 165° C. for five hours. During this period water was removed azeotropically. The mixture was cooled, diluted with heptane and filtered. Hexane and other volatiles were removed with a stream of nitrogen at 235° C. Viscosity of the mixture at 210° F. was 10.84 Cst.

EXAMPLE II

Into a 1 liter, three-neck flask equipped with a reflux condenser, stirrer, nitrogen inlet tube, heater and thermostat was charged 250 grams (0.067 moles) of a 10 wt. % solution of ethylene-propylene-5-ethylidene-2-norbornene terpolymer in 5 W oil and 1.5 grams (0.046 moles) sulfur. The mixture was stirred and heated to a temperature of 225° C. until the evolution of $H_2S$ ceased (about 2.5 hours. The mixture was cooled to 100° C. and 2.5 grams (0.13 moles) of tetraethylene pentamine was added. The mixture was stirred and heated to a temperature of 190° C. until $H_2S$ evolution again ceased (about 0.5 hours). About 5.0 grams (0.07 moles) of calcium hydroxide was added and the mixture was stirred and heated to a temperature of 190° C. for 1 hour. The product was filtered through Celite. The product was too viscous to measure viscosity.

EXAMPLE III

Thirteen hundred twenty (1320) grams of an ethylene, propylene, 5-ethylidene-2-norbornene terpolymer ($\overline{M}n=35,000$, $\overline{M}w=175,000$) was dissolved in 13,200 grams of SX-5 W oil at 180° C. Three hundred forty (340) grams of polyisobutylene ($\overline{M}n=2,024$) were added. The solution was cooled to about 100° C. and about 15 liters of heptane were added. Twenty milliliters of tertiary C12 mercaptan were added to the solution and the polymers were passed through a Gaulin mechanical homogenizer until the viscosity of the solution was about 3,069 SUS at 210° F. Heptane was removed from the solution by distillation at 100° C. under nitrogen. The solution contained 7.54 percent sheared terpolymer, 73.67 percent oil, and 18.97 percent polyisobutylene.

To 1000 gms of the product prepared above in a three-neck 1-liter reaction vessel equipped with a reflux condenser, water trap, stirrer, nitrogen inlet tube, heater and thermostat were maintained at 180° C., were added 19.82 grams (0.62 moles) sulfur. The solution was mixed and the temperature was raised to 235° C. for five hours and $H_2S$ evolution was measured. At five hours reaction time, 2.0 cubic feet of nitrogen per hour was passed through the solution at 235° C. to remove volatiles. The solution was cooled to 80° C. and 80 milliliters of xylene, 11.47 grams (0.06 moles) of tetraethylenepentaamine, 20 grams (0.34 moles) of magnesium hydroxide, and 20 milliliters of water were added to the solution. The water was slowly removed azeotropically and the solution was held at 165° C. for five hours. The solution was diluted with an equal volume of xylene and filtered. To the filtrate, stripped of volatile material, including xylene and water, was added 3.75 grams (0.06 moles) of boric acid and 19.7 grams (0.24 moles) of 37 weight percent formaldehyde solution. The resulting solution was stirred at 80° C. for 30 minutes and water and solvent were again removed at 175° C. with a stream of nitrogen.

TABLE I

| VISCOSITY OF PRODUCTS | |
|---|---|
| | @ 210° F. (SSU) |
| EXAMPLE I | 10.87 |
| EXAMPLE II | Too viscous to measure |

TABLE II

| SPOT DISPERSANCY TEST | |
|---|---|
| | % Dispersancy |
| EXAMPLE III | 91.0 |
| Commercial Dispersant Viscosity index improver | 91.0 |

An examination of Table I of data shows that the viscosity of the product of Example II, prepared from an ethylene-propylene-5-ethylidene-2-norbornene terpolymer, is too viscous to measure, and too viscous to be useful in a lubricant. The product of Example I, prepared from a mixture of the ethylene-propylene-5-ethylidene-2-norbornene terpolymer and polyisobutylene polymer, however, has a viscosity suitable for use in a finished lubricant. In Table II the product of Example III has an excellent dispersancy when compared to a commercial dispersant viscosity index improver.

The foregoing specification and examples are illustrative of the invention. Since many embodiments of the invention can be made, the invention resides solely in the claims hereinafter appended.

I claim:

1. A lubricating oil which comprises a major portion of a lubricating base oil and about 0.01 to 20 wt.% based on the lubricating oil of a dispersant viscosity index improver resistant to viscosity and molecular weight increase during production, which comprises the reaction product of an amine, sulfur or a sulfur-yielding compound and a mixture of polyisobutylene and a substantially amorphous polymer comprising ethylene and at least one monomer selected from the group consisting of a $C_{3-18}$ olefin, and a $C_{4-18}$ diene.

* * * * *

UNITED STATES PATENT OFFICE
CERTIFICATE OF CORRECTION

Patent No. 4,320,017　　　　　　　　　Dated March 16, 1982

Inventor(s) J. Ronald Spence

It is certified that error appears in the above-identified patent and that said Letters Patent are hereby corrected as shown below:

Column 2, line 14, "a polyethylene units" should read --polyethylene units--.

Column 2, line 68, "ethylene-hexene-butadiene, terpolymers" should read --ethylene-hexene-butadiene terpolymers--.

Column 4, lines 38-39, "pololefin" should read --polyolefin--.

Column 4, line 58, "ease reaction" should read --ease of reaction--.

Column 5, line 38, "which an" should read --which can--.

Column 5, line 55, "character or" should read --character of--.

Column 7, line 20, "(about 2.5 hours." should read --(about 2.5 hours).--

Column 7, line 41, "SUS" should read --SSU--.

Column 7, line 49, "were maintained" should read --maintained--.

Column 8, line 48, "improper" should read --improver--.

Signed and Sealed this

Twenty-fourth　Day of September 1985

[SEAL]

Attest:

DONALD J. QUIGG

Attesting Officer　　　Commissioner of Patents and
　　　　　　　　　　　　Trademarks—Designate